United States Patent

Maeno

(10) Patent No.: US 9,550,677 B2
(45) Date of Patent: Jan. 24, 2017

(54) CARBON NANOTUBE COMPOSITE STRUCTURAL BODY AND PRESSURE-SENSITIVE ADHESIVE MEMBER

(75) Inventor: Youhei Maeno, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 10 days.

(21) Appl. No.: 13/518,274

(22) PCT Filed: Sep. 1, 2010

(86) PCT No.: PCT/JP2010/064896
§ 371 (c)(1),
(2), (4) Date: Jun. 21, 2012

(87) PCT Pub. No.: WO2011/077785
PCT Pub. Date: Jun. 30, 2011

(65) Prior Publication Data
US 2012/0258275 A1    Oct. 11, 2012

(30) Foreign Application Priority Data

Dec. 25, 2009  (JP) .................................. 2009-293882

(51) Int. Cl.
*B32B 15/04*  (2006.01)
*C01B 31/02*  (2006.01)
(Continued)

(52) U.S. Cl.
CPC ............ *C01B 31/0226* (2013.01); *B82Y 30/00* (2013.01); *B82Y 40/00* (2013.01); *Y10T 428/23979* (2015.04); *Y10T 428/23993* (2015.04)

(58) Field of Classification Search
CPC . B82Y 30/00; B82Y 40/00; Y10T 428/23979; Y10T 428/23993
(Continued)

(56) References Cited

U.S. PATENT DOCUMENTS 6,283,812 B1  9/2001  Jin et al.
6,628,053 B1  9/2003  Den et al.
(Continued)

FOREIGN PATENT DOCUMENTS

CN  1532142 A     9/2004
CN  101314465 A  12/2008
(Continued)

OTHER PUBLICATIONS

Office Action, dated Feb. 17, 2014, issued by the State Intellectual Property Office, in counterpart Application No. 201080058725.6.
(Continued)

*Primary Examiner* — Peter Y Choi
*Assistant Examiner* — Vincent A Tatesure
(74) *Attorney, Agent, or Firm* — Sughrue Mion, PLLC (57) ABSTRACT

Provided is a carbon nanotube composite structural body including, on a base material, a plurality of carbon nanotube columnar structural bodies, the carbon nanotube composite structural body having an extremely high adhesion strength between the base material and the carbon nanotube columnar structural bodies. Also provided is a pressure-sensitive adhesive member including such carbon nanotube composite structural body. The carbon nanotube composite structural body of the present invention is a carbon nanotube composite structural body, including, on a base material, a plurality of carbon nanotube columnar structural bodies, in which: the carbon nanotube composite structural body further includes an intermediate layer between the base material and the carbon nanotube columnar structural bodies; the intermediate layer has a thickness of 1.0 nm or more and less than 10 nm; and an adhesion strength between the base material with the intermediate layer and the carbon nanotube columnar structural bodies is 5 N/cm² or more.

3 Claims, 4 Drawing Sheets

(51) Int. Cl.
B82Y 30/00 (2011.01)
B82Y 40/00 (2011.01)

(58) Field of Classification Search
USPC ............ 977/742, 750, 752, 902; 428/95, 97
See application file for complete search history.

(56) References Cited

U.S. PATENT DOCUMENTS

| | | |
|---|---|---|
| 6,720,728 B2 | 4/2004 | Den et al. |
| 6,979,244 B2 | 12/2005 | Den et al. |
| 7,148,619 B2 | 12/2006 | Den et al. |
| 7,160,532 B2 | 1/2007 | Liu et al. |
| 7,453,193 B2 | 11/2008 | Den et al. |
| 8,022,610 B2 | 9/2011 | Den et al. |
| 2003/0197456 A1 | 10/2003 | Den et al. |
| 2004/0071870 A1 | 4/2004 | Knowles et al. |
| 2004/0116034 A1 | 6/2004 | Den et al. |
| 2004/0184981 A1 | 9/2004 | Liu et al. |
| 2006/0033415 A1 | 2/2006 | Den et al. |
| 2006/0068195 A1 | 3/2006 | Majumdar et al. |
| 2007/0205707 A1 | 9/2007 | Den et al. |
| 2008/0181839 A1 | 7/2008 | Arendt et al. |
| 2008/0299308 A1 | 12/2008 | Luo et al. |
| 2008/0315745 A1 | 12/2008 | Den et al. |
| 2012/0115402 A1* | 5/2012 | Wu et al. ............ 451/443 |

FOREIGN PATENT DOCUMENTS

| | | |
|---|---|---|
| JP | 11-194134 A | 7/1999 |
| JP | 2000-223005 A | 8/2000 |
| JP | 2002-206169 A | 7/2002 |

OTHER PUBLICATIONS

Notification of Argument Submission dated Oct. 6, 2016, issued by the Korean Intellectual Property Office in corresponding KR Application No. 10-2012-7016285.

* cited by examiner

CARBON NANOTUBE COMPOSITE STRUCTURAL BODY AND PRESSURE-SENSITIVE ADHESIVE MEMBER

CROSS REFERENCE TO RELATED APPLICATION

This application is a National Stage of International Application No. PCT/JP2010/064896, filed on Sep. 1, 2010, which claims priority from Japanese Patent Application No. 2009-293882, filed Dec. 25, 2009, the contents of all of which are incorporated herein by reference in their entirety.

TECHNICAL FIELD

The present invention relates to a carbon nanotube composite structural body. Specifically, the present invention relates to a carbon nanotube composite structural body including, on a base material, a plurality of carbon nanotube columnar structural bodies. The present invention also relates to a pressure-sensitive adhesive member including the carbon nanotube composite structural body.

BACKGROUND ART

A carbon nanotube has been expected to find use in various functional materials because of, for example, its excellent thermal and electrical characteristics. Accordingly, various investigations have been conducted on the productivity, applications, and the like of the carbon nanotube. For example, the following is given as an approach to putting the carbon nanotube into practical use as a functional material. A carbon nanotube aggregate formed of a plurality of carbon nanotube columnar structural bodies is prepared, and the characteristics of the aggregate are improved.

An application of the carbon nanotube aggregate is, for example, a pressure-sensitive adhesive (Patent Literature 1 and Patent Literature 2). Although various materials have been used in pressure-sensitive adhesives for industrial applications, most of the materials are each a viscoelastic body designed to be a soft bulk. The viscoelastic body wets, and conforms to, an adherend because of its low modulus, and then exerts its adhesive strength. On the other hand, it has been revealed that as its diameter is of a nanometer size, the carbon nanotube follows the surface unevenness of the adherend and then exerts its adhesive strength by virtue of a van der Waals force.

A carbon nanotube composite structural body including, on a base material, the carbon nanotube aggregate formed of the plurality of carbon nanotube columnar structural bodies is applicable to various applications such as a pressure-sensitive adhesive member.

The carbon nanotube composite structural body is generally produced by growing and forming the carbon nanotube on the base material by a chemical vapor deposition method (CVD method). The growth and formation of the carbon nanotube by the chemical vapor deposition method (CVD method) are generally performed under a high temperature of about 400 to 800° C. Accordingly, a highly heat-resistant material showing high durability even under high temperatures is used as the base material. However, the base material formed of such highly heat-resistant material involves a problem in that the base material has a low adhesion strength with the carbon nanotube. When the adhesion strength between the carbon nanotube and the base material is low as described above, the application of the carbon nanotube composite structural body to, for example, a pressure-sensitive adhesive member involves the following problem. The carbon nanotube aggregate formed of the plurality of carbon nanotube columnar structural bodies needs to be transferred onto another base material, and hence a production cost increases.

Heretofore, a silicon substrate has been representatively used as the base material in which the highly heat-resistant material is used. However, the silicon substrate involves a problem in that the silicon substrate is expensive. In addition, the following problem arises. The silicon substrate is hardly applied to an application where flexibility (for example, such flexibility that the substrate can be bent by 180°) is requested because the substrate is rigid. Further, the following problem arises. The silicon substrate is considerably inferior in thermal conductivity and electric conductivity to the carbon nanotube.

In view of the foregoing, attention should be paid to a base material except the silicon substrate as the base material in which the highly heat-resistant material is used. However, such base material involves a problem in that the base material has an extremely low adhesion strength with the carbon nanotube.

CITATION LIST

Patent Literature

[PTL 1] US 2004/0071870 A1
[PTL 2] US 2006/0068195 A1

SUMMARY OF INVENTION

Technical Problem

An object of the present invention is to provide a carbon nanotube composite structural body including, on a base material, a plurality of carbon nanotube columnar structural bodies, the carbon nanotube composite structural body having an extremely high adhesion strength between the base material and the carbon nanotube columnar structural bodies. Another object of the present invention is to provide a pressure-sensitive adhesive member including such carbon nanotube composite structural body.

Solution to Problem

A carbon nanotube composite structural body of the present invention includes, on a base material, a plurality of carbon nanotube columnar structural bodies, in which: the carbon nanotube composite structural body further includes an intermediate layer between the base material and the carbon nanotube columnar structural bodies; the intermediate layer has a thickness of 1.0 nm or more and less than 10 nm; and an adhesion strength between the base material with the intermediate layer and the carbon nanotube columnar structural bodies is 5 N/cm$^2$ or more.

In a preferred embodiment, the intermediate layer is formed of an inorganic oxide.

In a preferred embodiment, the base material is formed of any one of copper and a copper alloy containing 50 wt % or more of copper.

In a preferred embodiment, the base material has a Young's modulus of 250 GPa or less.

In another embodiment of the present invention, there is provided a pressure-sensitive adhesive member. The pressure-sensitive adhesive member of the present invention includes the carbon nanotube composite structural body of the present invention.

Advantageous Effects of Invention

According to the present invention, it is possible to provide the carbon nanotube composite structural body including, on a base material, a plurality of carbon nanotube columnar structural bodies, the carbon nanotube composite structural body having an extremely high adhesion strength between the base material and the carbon nanotube columnar structural bodies. It is also possible to provide the pressure-sensitive adhesive member including such carbon nanotube composite structural body.

In addition, according to the preferred embodiment of the present invention, as a result of the adoption of the specific base material as the base material, there can be provided the following carbon nanotube composite structural body. The adhesion strength between the base material and the carbon nanotube columnar structural bodies is extremely high. In addition, the carbon nanotube composite structural body not only has such excellent flexibility that the structural body can be bent by 180° but also is capable of expressing an excellent thermal conductivity and an excellent electric conductivity. There can also be provided a pressure-sensitive adhesive member including such carbon nanotube composite structural body.

REFERENCE SIGNS LIST 1 base material
2 carbon nanotube columnar structural body
3 intermediate layer
10 carbon nanotube composite structural body

DESCRIPTION OF EMBODIMENTS

Figure 1:
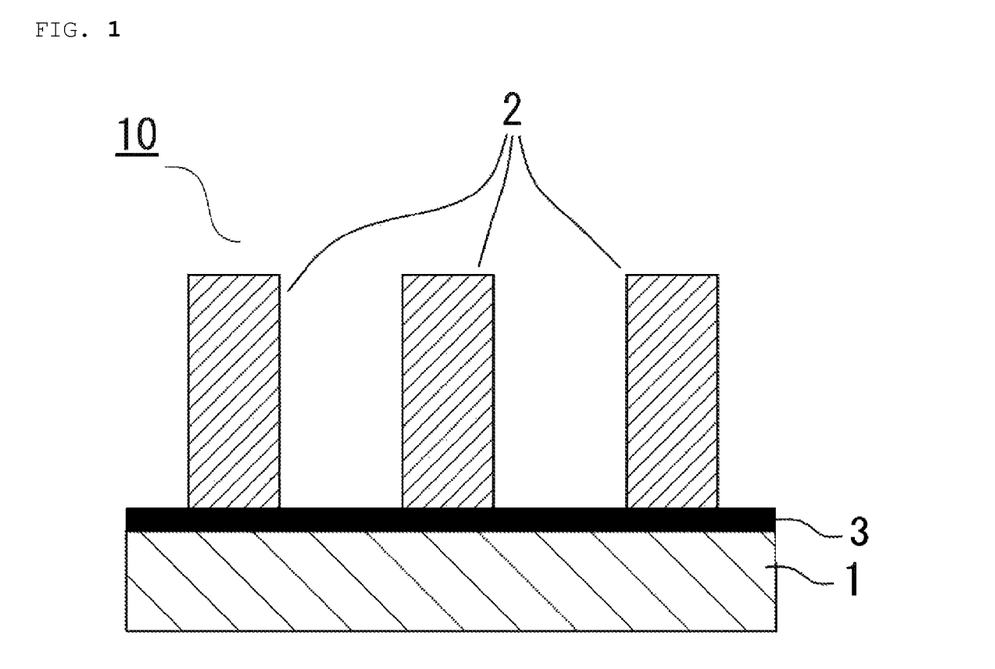
FIG. 1 is a schematic sectional view of a carbon nanotube composite structural body in a preferred embodiment of the present invention.

FIG. 1 illustrates a schematic sectional view of a representative carbon nanotube composite structural body in a preferred embodiment of the present invention (the structural body is not illustrated to correct scale in order that each component may be clearly illustrated). A carbon nanotube composite structural body 10 includes a base material 1, a plurality of carbon nanotube columnar structural bodies 2, and an intermediate layer 3.

In the carbon nanotube composite structural body of the present invention, an adhesion strength between the base material with the intermediate layer and the carbon nanotube columnar structural bodies is 5 N/cm² or more. The adhesion strength is preferably 7 to 500 N/cm², more preferably 10 to 200 N/cm². As long as the adhesion strength between the base material with the intermediate layer and the carbon nanotube columnar structural bodies falls within the range, it becomes very easy to apply the carbon nanotube composite structural body to a pressure-sensitive adhesive member. For example, the adhesion strength between the base material with the intermediate layer and the carbon nanotube columnar structural bodies is sufficiently high, and hence there is no need to transfer a carbon nanotube aggregate formed of the plurality of carbon nanotube columnar structural bodies onto another base material, and a reduction in production cost can be realized.

In the carbon nanotube composite structural body of the present invention, the tip of each of the carbon nanotube columnar structural bodies has a shearing adhesive strength against glass at 25° C. of preferably 15 N/cm² or more, more preferably 15 to 200 N/cm², still more preferably 20 to 200 N/cm², particularly preferably 25 to 200 N/cm², most preferably 30 to 200 N/cm². As long as the shearing adhesive strength against glass at 25° C. of the tip of each of the carbon nanotube columnar structural bodies falls within the range, when the carbon nanotube composite structural body of the present invention is used as a pressure-sensitive adhesive member, the pressure-sensitive adhesive member can show an extremely excellent pressure-sensitive adhesive characteristic.

The carbon nanotube columnar structural bodies may each be single-walled or multi-walled. In addition, the diameters, specific surface areas, and densities of the carbon nanotube columnar structural bodies can each be set to any appropriate value.

With regard to the shape of each of the carbon nanotube columnar structural bodies, its cross-section has only to have any appropriate shape. Examples of the shape of the cross-section include a substantially circular shape, an elliptical shape, and an n-gon (where n represents an integer of 3 or more).

The length of each of the carbon nanotube columnar structural bodies can be set to any appropriate length. The length of each of the carbon nanotube columnar structural bodies is preferably 300 to 10,000 μm, more preferably 400 to 1,000 μm, still more preferably 500 to 1,000 μm. As long as the length of each of the carbon nanotube columnar structural bodies falls within the range, when the carbon nanotube composite structural body of the present invention is used as a pressure-sensitive adhesive member, the pressure-sensitive adhesive member can show an extremely excellent pressure-sensitive adhesive characteristic.

The distribution width of the wall number distribution of the carbon nanotube columnar structural bodies which the carbon nanotube composite structural body of the present invention includes, the mode of the wall number distribution, and the relative frequency of the mode can each take any appropriate value. Here, the term "distribution width of the wall number distribution" refers to a difference between the maximum wall number and minimum wall number of the wall numbers of the carbon nanotube columnar structural bodies. Such wall numbers and wall number distribution have only to be measured with any appropriate apparatus. The measurement is preferably performed with a scanning electron microscope (SEM) or a transmission electron microscope (TEM). For example, 20 or more carbon nanotube columnar structural bodies have only to be subjected to measurement with the SEM or the TEM.

The carbon nanotube columnar structural bodies which the carbon nanotube composite structural body of the present invention includes can adopt, for example, the following first preferred embodiment or second preferred embodiment.

First Preferred Embodiment of Carbon Nanotube Columnar Structural Bodies

The first preferred embodiment of the carbon nanotube columnar structural bodies which the carbon nanotube composite structural body of the present invention includes is such that their wall number distribution preferably has a distribution width of 10 walls or more and the relative frequency of the mode of the wall number distribution is preferably 25% or less. The distribution width of the wall number distribution is more preferably 10 to 30 walls, still more preferably 10 to 25 walls, particularly preferably 10 to 20 walls. The maximum wall number in the wall number distribution is preferably 5 to 30 walls, more preferably 10 to 30 walls, still more preferably 15 to 30 walls, particularly preferably 15 to 25 walls. The minimum wall number in the wall number distribution is preferably 1 to 10 walls, more preferably 1 to 5 walls. The relative frequency of the mode of the wall number distribution is more preferably 1 to 25%, still more preferably 5 to 25%, particularly preferably 10 to 25%, most preferably 15 to 25%. The mode of the wall number distribution exists at preferably 2 to 10 walls, more preferably 3 to 10 walls. As long as the carbon nanotube columnar structural bodies which the carbon nanotube composite structural body of the present invention includes adopt such embodiment as described above, when the carbon nanotube composite structural body of the present invention is used as a pressure-sensitive adhesive member, the pressure-sensitive adhesive member can show an extremely excellent pressure-sensitive adhesive characteristic.

Second Preferred Embodiment of Carbon Nanotube Columnar Structural Bodies

The second preferred embodiment of the carbon nanotube columnar structural bodies which the carbon nanotube composite structural body of the present invention includes is such that the mode of their wall number distribution preferably exists at a wall number of 10 or less and the relative frequency of the mode is preferably 30% or more. The mode of the wall number distribution exists at more preferably 9 walls or less, still more preferably 1 to 9 walls, particularly preferably 2 to 8 walls, most preferably 3 to 8 walls. The maximum wall number in the wall number distribution is preferably 1 to 20 walls, more preferably 2 to 15 walls, still more preferably 3 to 10 walls. The minimum wall number in the wall number distribution is preferably 1 to 10 walls, more preferably 1 to 5 walls. The relative frequency of the mode of the wall number distribution is more preferably 30 to 100%, still more preferably 30 to 90%, particularly preferably 30 to 80%, most preferably 30 to 70%. The mode of the wall number distribution exists at preferably 1 to 10 walls, more preferably 2 to 8 walls, still more preferably 2 to 6 walls. As long as the carbon nanotube columnar structural bodies which the carbon nanotube composite structural body of the present invention includes adopt such embodiment as described above, when the carbon nanotube composite structural body of the present invention is used as a pressure-sensitive adhesive member, the pressure-sensitive adhesive member can show an extremely excellent pressure-sensitive adhesive characteristic.

Any appropriate base material can be adopted as the base material in the carbon nanotube composite structural body of the present invention as long as the base material is formed of a highly heat-resistant material. Examples of the base material include a base material formed of an inorganic material and a base material formed of a metal material. Of those, a base material formed of a metal material is preferred, and a base material formed of any one of copper and a copper alloy containing 50 wt % or more of copper is more preferred. As long as the base material in the carbon nanotube composite structural body of the present invention is formed of any one of copper and the copper alloy containing 50 wt % or more of copper, the following carbon nanotube composite structural body can be provided. The carbon nanotube composite structural body not only has additionally excellent flexibility but also is capable of expressing an additionally excellent thermal conductivity and an additionally excellent electric conductivity.

The inorganic material is, for example, graphite.

The copper alloy containing 50 wt % or more of copper can contain any appropriate other metal to such an extent that an effect of the present invention can be expressed as long as the copper alloy contains 50 wt % or more of copper. Examples of such other metal include nickel, iron, chromium, zinc, tin, silicon, manganese, magnesium, titanium, zirconium, silver, and cobalt. Specific examples of the copper alloy include brass, cupronickel, bronze, nickel silver, and a Kovar alloy.

The base material in the carbon nanotube composite structural body of the present invention has a Young's modulus of preferably 250 GPa or less, more preferably 1.0 to 200 GPa, still more preferably 5.0 to 150 GPa.

The carbon nanotube composite structural body of the present invention can have excellent flexibility as long as the Young's modulus of the base material therein is 250 GPa or less.

The base material in the carbon nanotube composite structural body of the present invention has a thermal conductivity of preferably 1 to 5,000 W/mK, more preferably 10 to 4,000 W/mK, still more preferably 50 to 3,000 W/mK, particularly preferably 150 to 3,000 W/mK. As long as the thermal conductivity of the base material in the carbon nanotube composite structural body of the present invention falls within the range, a carbon nanotube composite structural body capable of expressing an additionally excellent thermal conductivity can be provided.

The base material in the carbon nanotube composite structural body of the present invention has an electric conductivity of preferably $1.0 \times 10^7$ $m^{-1} \cdot \Omega^{-1}$ or more, more preferably $1.0 \times 10^7$ to $50 \times 10^7$ $m^{-1} \cdot \Omega^{-1}$, still more preferably $1.0 \times 10^7$ to $20 \times 10^7$ $m^{-1} \cdot \Omega^{-1}$, particularly preferably $1.0 \times 10^7$ to $10 \times 10^7$ $m^{-1} \cdot \Omega^{-1}$. As long as the electric conductivity of the base material in the carbon nanotube composite structural body of the present invention falls within the range, a carbon nanotube composite structural body capable of expressing an additionally excellent electric conductivity can be provided.

Any appropriate thickness can be adopted as the thickness of the base material in the carbon nanotube composite structural body of the present invention depending on purposes. The thickness is preferably 200 µm or less, more preferably 0.01 to 200 µm, still more preferably 0.1 to 100 µm, particularly preferably 1 to 100 µm. Setting the thickness of the base material in the carbon nanotube composite structural body of the present invention within the range can provide a carbon nanotube composite structural body having additionally excellent flexibility.

Any appropriate material can be adopted for the intermediate layer in the carbon nanotube composite structural body of the present invention. The material is preferably an inorganic oxide. Examples of such inorganic oxide include silica ($SiO_2$), alumina ($Al_2O_3$), silica-alumina ($SiO_2$—$Al_2O_3$), titania ($TiO_2$), zirconia (ZrO), and magnesia (MgO). Such inorganic oxides may be used alone or in combination.

The intermediate layer in the carbon nanotube composite structural body of the present invention has a thickness of 1.0 nm or more and less than 10 nm. The thickness is preferably 2 nm or more and 9 nm or less, more preferably 3 nm or more and 8 nm or less. Setting the thickness of the intermediate layer in the carbon nanotube composite structural body of the present invention within the range can provide a carbon nanotube composite structural body having an extremely high adhesion strength between the base material and the carbon nanotube columnar structural bodies.

Any appropriate method can be adopted as a method of producing the intermediate layer in the carbon nanotube composite structural body of the present invention. The method is, for example, a method involving forming a thin film on the base material by sputtering.

The carbon nanotube composite structural body of the present invention is preferably obtained by: forming the intermediate layer on the surface of the base material; forming a catalyst layer on the intermediate layer; and growing a carbon nanotube on the catalyst layer by a chemical vapor deposition method (CVD method).

Figure 2:
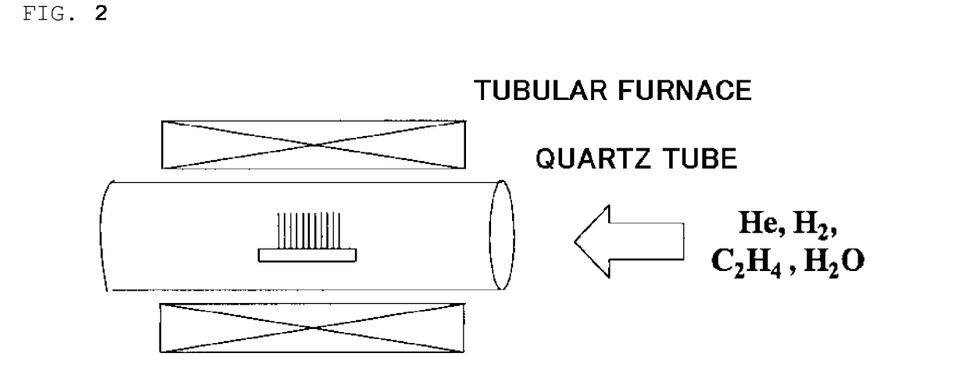
FIG. 2 is a schematic sectional view of an apparatus for producing a carbon nanotube aggregate in a preferred embodiment of the present invention.

Any appropriate apparatus can be adopted as an apparatus that can be used upon production of the carbon nanotube composite structural body of the present invention. A thermal CVD apparatus is, for example, such a hot wall-type apparatus as illustrated in FIG. 2 constructed by surrounding a cylindrical reaction vessel with a resistance heating-type electric tubular furnace. In such case, for example, a heat-resistant quartz tube is preferably used as the reaction vessel.

Any appropriate method can be adopted as a method of forming the catalyst layer on the intermediate layer. The method is, for example, a method involving depositing a metal catalyst from the vapor by means of an electron beam (EB), sputtering, or the like, or a method involving applying a suspension of metal catalyst fine particles onto a substrate.

Any appropriate catalyst can be used as a catalyst (a material for the catalyst layer) that can be used upon production of the carbon nanotube composite structural body of the present invention. Examples of the catalyst include metal catalysts such as iron, cobalt, nickel, gold, platinum, silver, and copper.

The catalyst layer has a thickness of preferably 0.01 to 20 nm, more preferably 0.1 to 10 nm, still more preferably 0.1 to 5 nm, particularly preferably 1 to 3 nm. As long as the thickness of the catalyst layer falls within the range, the adhesion strength between the plurality of carbon nanotube columnar structural bodies and the base material can be expressed in an additionally sufficient fashion.

Any appropriate carbon source can be used as a carbon source serving as a raw material for the carbon nanotube that can be used upon production of the carbon nanotube composite structural body of the present invention. Examples of the carbon source include: hydrocarbons such as methane, ethylene, acetylene, and benzene; and alcohols such as methanol and ethanol.

The carbon nanotube composite structural body of the present invention can be turned into a pressure-sensitive adhesive member. A pressure-sensitive adhesive member of the present invention includes the carbon nanotube composite structural body of the present invention. Examples of the pressure-sensitive adhesive member include a pressure-sensitive adhesive sheet and a pressure-sensitive adhesive film.

The pressure-sensitive adhesive member of the present invention may be such that the carbon nanotube composite structural body of the present invention is fixed to any appropriate substrate. Alternatively, the carbon nanotube composite structural body of the present invention may be used as the pressure-sensitive adhesive member without being treated.

When the pressure-sensitive adhesive member of the present invention has a substrate, examples of the substrate include quartz glass, silicon (such as silicon wafer), an engineering plastic, and a super engineering plastic. Specific examples of the engineering plastic and the super engineering plastic include polyimide, polyethylene, polyethylene terephthalate, acetyl cellulose, polycarbonate, polypropylene, and polyamide. Any appropriate physical property can be adopted as each of various physical properties such as a molecular weight to such an extent that an object of the present invention can be achieved.

When the pressure-sensitive adhesive member of the present invention has a substrate, the thickness of the substrate can be set to any appropriate value depending on purposes. The thickness is, for example, preferably 1 to 10,000 μm, more preferably 5 to 5,000 μm, still more preferably 10 to 1,000 μm.

The surface of the substrate may be subjected to a conventional surface treatment, e.g., a chemical or physical treatment such as a chromic acid treatment, ozone exposure, flame exposure, high-voltage electric shock exposure, or an ionizing radiation treatment, or a coating treatment with a primer in order that its adhesiveness with an adjacent layer, retaining property, or the like may be improved.

The substrate may be a single-layer body, or may be a multi-layer body.

When the carbon nanotube composite structural body of the present invention is fixed to the substrate, any appropriate method can be adopted as a method for the fixation. For example, the fixation may be performed by providing the substrate with an adhesion layer. In addition, when the substrate is a thermosetting resin, the fixation has only to be performed by carrying out a curing treatment. In addition, when the substrate is a thermoplastic resin, a metal, or the like, the fixation has only to be performed by crimping the carbon nanotube composite structural body onto the substrate in a molten state and cooling the resultant to room temperature.

EXAMPLES

Hereinafter, the present invention is described in more detail by way of examples. However, the present invention is not limited to the examples. It should be noted that, unless otherwise stated, "part(s)" and "%" in the examples are by weight (mass).

<<Method of Measuring Adhesion Strength Between Base Material and Carbon Nanotube Columnar Structural Bodies>>

A plurality of carbon nanotube columnar structural bodies in a carbon nanotube composite structural body cut out into a unit area of 1 cm$^2$ were mounted on glass (MATSUNAMI SLIDE GLASS measuring 27 mm by 56 mm) so that their tips were brought into contact with the glass, and then a 5-kg roller was reciprocated once so that the tips of the carbon nanotube columnar structural bodies were crimped onto the glass. After that, the resultant was left to stand for 30 minutes. The resultant was pulled with a tensile tester (Instron Tensil Tester) at 25° C. and a tension speed of 50 mm/min, and then it was confirmed that the release surface was an interface between the base material with an intermediate layer and the carbon nanotube columnar structural bodies. After that, a shearing adhesive strength per unit area was determined.

<<Measurement of Young's Modulus>>

Figure 3:
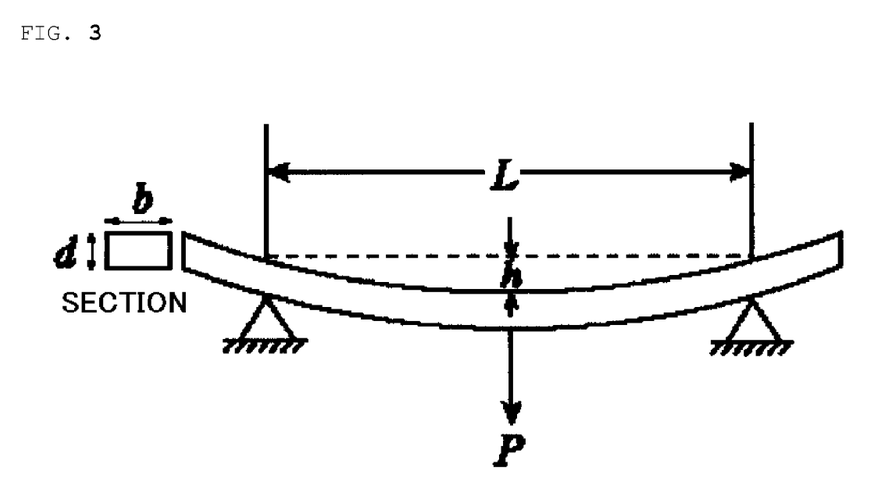
FIG. 3 is a schematic sectional view illustrating a method of measuring a Young's modulus.

A deflection (h mm) occurring when a load (P N) was applied to the central portion of such a plate-like sample (d×b×L mm) with both of its ends supported as illustrated in FIG. 3 was detected with a differential transformer transducer, and then its Young's modulus E (N/m$^2$) was calculated from the following expression.

$$E=(1/4)(L^3/(d^3 \cdot b))(P/h) \times 10^6$$

<<Evaluation for Thermal Conductivity>>

The thermal conductivity of the base material at a measurement temperature of 25° C. was measured with an "LE/TCM-FA8510B" apparatus manufactured by Rigaku Corporation according to a laser flash method by adopting a thermal diffusivity (t½ method) and a specific heat (extrapolation method) as measurement items.

<<Evaluation for Electric Conductivity>>

Figure 4:
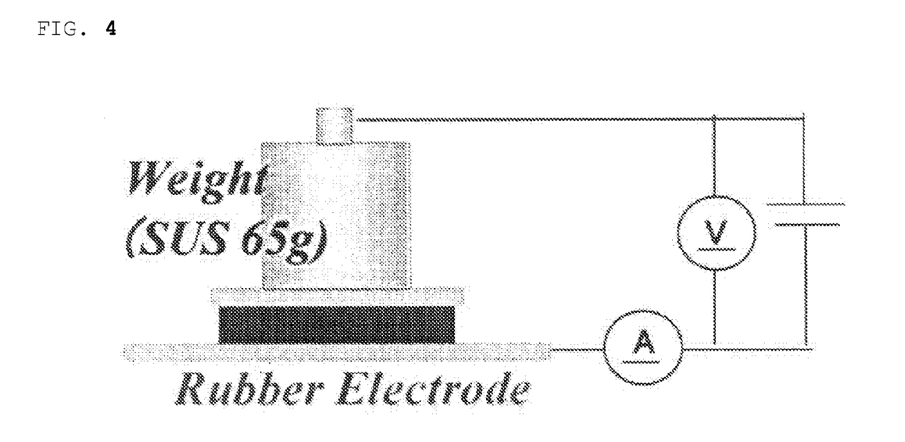
FIG. 4 is a schematic sectional view of an apparatus for measuring a volume resistivity.

Volume resistivity measurement was performed as an evaluation for electric conductivity. A volume resistivity in a vertical direction was measured with an apparatus illustrated in FIG. 4. That is, the base material was cut out so as to have a diameter of 10 mm and a thickness of 35 μm, both ends of the base material were sandwiched between conductive rubber electrodes (each containing Ag and having a volume resistivity of $5.07 \times 10^{-3}$ Ω·cm), an SUS weight (65 g) was mounted on the upper rubber electrode, a voltage (1.0 V) was applied, and then the volume resistivity (ρV) was determined from a current quantity (volume resistivity ρV (Ω·cm)=(voltage (V)/current (A))×(area ($cm^2$)/thickness (cm))). The reciprocal of the measured volume resistivity (ρV) was defined as the electric conductivity.

Example 1

An MgO thin film (having a thickness of 5 nm) was formed on an SUS444 base material (manufactured by MORIMATSU INDUSTRY CO., LTD. and having a thickness of 35 μm) with a sputtering apparatus (RFS-200 manufactured by ULVAC, Inc.). An Fe thin film (having a thickness of 1 nm) was further deposited from the vapor onto the MgO thin film with a sputtering apparatus (RFS-200 manufactured by ULVAC, Inc.) so that a catalyst layer was formed.

Next, the base material with the catalyst layer was cut and mounted in a quartz tube having a diameter of 30 mm, and then a helium/hydrogen mixed gas (120/80 sccm) with its moisture content kept at 350 ppm was flowed into the quartz tube for 30 minutes so that the inside of the tube was replaced. After that, the temperature in the tube was increased to 765° C. in stages over 35 minutes with an electric tubular furnace, and then the temperature was stabilized at 765° C. After the base material had been left to stand at 765° C. for 10 minutes, a helium/hydrogen/ethylene mixed gas (105/80/15 sccm, moisture content: 350 ppm) was filled into the tube while the temperature was retained. The base material was left to stand for 30 minutes so that a carbon nanotube was grown on the base material. Thus, a carbon nanotube composite structural body (1) was obtained.

Carbon nanotube columnar structural bodies (1) in the resultant carbon nanotube composite structural body (1) were as described below. The carbon nanotube columnar structural bodies each had a length of 540 μm, the mode of their wall number distribution existed at a wall number of 2, and the relative frequency of the mode was 61%.

Table 1 summarizes the results.

Example 2

A carbon nanotube composite structural body (2) was obtained in the same manner as in Example 1 except that an MgO thin film (having a thickness of 9 nm) was formed on an SUS444 base material (manufactured by MORIMATSU INDUSTRY CO., LTD. and having a thickness of 35 μm) with a sputtering apparatus (RFS-200 manufactured by ULVAC, Inc.).

Carbon nanotube columnar structural bodies (2) in the resultant carbon nanotube composite structural body (2) were as described below. The carbon nanotube columnar structural bodies each had a length of 595 μm, the mode of their wall number distribution existed at a wall number of 2, and the relative frequency of the mode was 60%.

Table 1 summarizes the results.

Example 3

A carbon nanotube composite structural body (3) was obtained in the same manner as in Example 1 except that: an $Al_2O_3$ thin film (having a thickness of 5 nm) was formed on a copper base material (JTCS manufactured by Nippon Mining & Metals Co., Ltd., thickness: 35 μm) with a sputtering apparatus (RFS-200 manufactured by ULVAC, Inc.); and an Fe thin film (having a thickness of 2 nm) was further deposited from the vapor onto the $Al_2O_3$ thin film with a sputtering apparatus (RFS-200 manufactured by ULVAC, Inc.) so that a catalyst layer was formed.

Carbon nanotube columnar structural bodies (3) in the resultant carbon nanotube composite structural body (3) were as described below. The carbon nanotube columnar structural bodies each had a length of 650 μm, the mode of their wall number distribution existed at a wall number of 3, and the relative frequency of the mode was 68%.

Table 1 summarizes the results.

Example 4

A carbon nanotube composite structural body (4) was obtained in the same manner as in Example 3 except that an $Al_2O_3$ thin film (having a thickness of 9 nm) was formed on a copper base material (JTCS manufactured by Nippon Mining & Metals Co., Ltd., thickness: 35 μm) with a sputtering apparatus (RFS-200 manufactured by ULVAC, Inc.).

Carbon nanotube columnar structural bodies (4) in the resultant carbon nanotube composite structural body (4) were as described below. The carbon nanotube columnar structural bodies each had a length of 710 μm, the mode of their wall number distribution existed at a wall number of 3, and the relative frequency of the mode was 69%.

Table 1 summarizes the results.

Example 5

A carbon nanotube composite structural body (5) was obtained in the same manner as in Example 1 except that: an $SiO_2$ thin film (having a thickness of 5 nm) was formed on a brass base material (C2680 manufactured by Nippon Mining & Metals Co., Ltd., thickness: 35 μm, copper:zinc=66:34 (weight ratio)) with a sputtering apparatus (RFS-200 manufactured by ULVAC, Inc.); and an Fe thin film (having a thickness of 1 nm) was further deposited from the vapor onto the $SiO_2$ thin film with a sputtering apparatus (RFS-200 manufactured by ULVAC, Inc.) so that a catalyst layer was formed.

Carbon nanotube columnar structural bodies (5) in the resultant carbon nanotube composite structural body (5) were as described below. The carbon nanotube columnar structural bodies each had a length of 575 μm, the mode of their wall number distribution existed at a wall number of 2, and the relative frequency of the mode was 60%.

Table 1 summarizes the results.

Example 6

A carbon nanotube composite structural body (6) was obtained in the same manner as in Example 5 except that an $SiO_2$ thin film (having a thickness of 9 nm) was formed on a brass base material (C2680 manufactured by Nippon Mining & Metals Co., Ltd., thickness: 35 μm, copper:zinc=66:34 (weight ratio)) with a sputtering apparatus (RFS-200 manufactured by ULVAC, Inc.).

Carbon nanotube columnar structural bodies (6) in the resultant carbon nanotube composite structural body (6) were as described below. The carbon nanotube columnar structural bodies each had a length of 620 μm, the mode of their wall number distribution existed at a wall number of 2, and the relative frequency of the mode was 67%.

Table 1 summarizes the results.

Example 7

A carbon nanotube composite structural body (7) was obtained in the same manner as in Example 1 except that: an Al$_2$O$_3$ thin film (having a thickness of 2 nm) was formed on a copper base material (JTCS manufactured by Nippon Mining & Metals Co., Ltd., thickness: 35 μm) with a sputtering apparatus (RFS-200 manufactured by ULVAC, Inc.); and an Fe thin film (having a thickness of 1 nm) was further deposited from the vapor onto the Al$_2$O$_3$ thin film with a sputtering apparatus (RFS-200 manufactured by ULVAC, Inc.) so that a catalyst layer was formed.

Carbon nanotube columnar structural bodies (7) in the resultant carbon nanotube composite structural body (7) were as described below. The carbon nanotube columnar structural bodies each had a length of 520 μm, the mode of their wall number distribution existed at a wall number of 2, and the relative frequency of the mode was 62%.

Table 1 summarizes the results.

Comparative Example 1

A carbon nanotube composite structural body (C1) was obtained in the same manner as in Example 1 except that an MgO thin film (having a thickness of 1 nm) was formed on an SUS444 base material (manufactured by MORIMATSU INDUSTRY CO., LTD. and having a thickness of 35 μm) with a sputtering apparatus (RFS-200 manufactured by ULVAC, Inc.).

Carbon nanotube columnar structural bodies (C1) in the resultant carbon nanotube composite structural body (C1) were as described below. The carbon nanotube columnar structural bodies each had a length of 500 μm, the mode of their wall number distribution existed at a wall number of 2, and the relative frequency of the mode was 55%.

Table 1 summarizes the results.

Comparative Example 2

A carbon nanotube composite structural body (C2) was obtained in the same manner as in Example 1 except that an MgO thin film (having a thickness of 20 nm) was formed on an SUS444 base material (manufactured by MORIMATSU INDUSTRY CO., LTD. and having a thickness of 35 μm) with a sputtering apparatus (RFS-200 manufactured by ULVAC, Inc.).

Carbon nanotube columnar structural bodies (C2) in the resultant carbon nanotube composite structural body (C2) were as described below. The carbon nanotube columnar structural bodies each had a length of 640 μm, the mode of their wall number distribution existed at a wall number of 2, and the relative frequency of the mode was 64%.

Table 1 summarizes the results.

Comparative Example 3

A carbon nanotube composite structural body (C3) was obtained in the same manner as in Example 3 except that an Al$_2$O$_3$ thin film (having a thickness of 1 nm) was formed on a copper base material (JTCS manufactured by Nippon Mining & Metals Co., Ltd., thickness: 35 μm) with a sputtering apparatus (RFS-200 manufactured by ULVAC, Inc.).

Carbon nanotube columnar structural bodies (C3) in the resultant carbon nanotube composite structural body (C3) were as described below. The carbon nanotube columnar structural bodies each had a length of 620 μm, the mode of their wall number distribution existed at a wall number of 3, and the relative frequency of the mode was 62%.

Table 1 summarizes the results.

Comparative Example 4

A carbon nanotube composite structural body (C4) was obtained in the same manner as in Example 3 except that an Al$_2$O$_3$ thin film (having a thickness of 20 nm) was formed on a copper base material (JTCS manufactured by Nippon Mining & Metals Co., Ltd., thickness: 35 μm) with a sputtering apparatus (RFS-200 manufactured by ULVAC, Inc.).

Carbon nanotube columnar structural bodies (C4) in the resultant carbon nanotube composite structural body (C4) were as described below. The carbon nanotube columnar structural bodies each had a length of 730 μm, the mode of their wall number distribution existed at a wall number of 3, and the relative frequency of the mode was 71%.

Table 1 summarizes the results.

Comparative Example 5

A carbon nanotube composite structural body (C5) was obtained in the same manner as in Example 5 except that an SiO$_2$ thin film (having a thickness of 1 nm) was formed on a brass base material (C2680 manufactured by Nippon Mining & Metals Co., Ltd., thickness: 35 μm, copper:zinc=66:34 (weight ratio)) with a sputtering apparatus (RFS-200 manufactured by ULVAC, Inc.).

Carbon nanotube columnar structural bodies (C5) in the resultant carbon nanotube composite structural body (C5) were as described below. The carbon nanotube columnar structural bodies each had a length of 320 μm, the mode of their wall number distribution existed at a wall number of 2, and the relative frequency of the mode was 62%.

Table 1 summarizes the results.

Comparative Example 6

A carbon nanotube composite structural body (C6) was obtained in the same manner as in Example 5 except that an SiO$_2$ thin film (having a thickness of 20 nm) was formed on a brass base material (C2680 manufactured by Nippon Mining & Metals Co., Ltd., thickness: 35 μm, copper:zinc=66:34 (weight ratio)) with a sputtering apparatus (RFS-200 manufactured by ULVAC, Inc.).

Carbon nanotube columnar structural bodies (C6) in the resultant carbon nanotube composite structural body (C6) were as described below. The carbon nanotube columnar structural bodies each had a length of 750 μm, the mode of their wall number distribution existed at a wall number of 2, and the relative frequency of the mode was 68%.

Table 1 summarizes the results.

Comparative Example 7

A carbon nanotube composite structural body (C7) was obtained in the same manner as in Example 7 except that an Al$_2$O$_2$ thin film (having a thickness of 1.5 nm) was formed on a copper base material (JTCS manufactured by Nippon Mining & Metals Co., Ltd., thickness: 35 μm) with a sputtering apparatus (RFS-200 manufactured by ULVAC, Inc.).

Carbon nanotube columnar structural bodies (C7) in the resultant carbon nanotube composite structural body (C7) were as described below. The carbon nanotube columnar structural bodies each had a length of 450 μm, the mode of their wall number distribution existed at a wall number of 2, and the relative frequency of the mode was 63%.

Table 1 summarizes the results.

TABLE 1

| | Base material | Intermediate layer (thickness) | Catalyst layer (thickness) | Adhesion strength (N/m$^2$) | Young's modulus of base material (GPa) | Thermal conductivity (W/mK) | Electric conductivity (m$^{-1}$Ω$^{-1}$) |
|---|---|---|---|---|---|---|---|
| Example 1 | SUS444 | MgO (5 nm) | Fe (1 nm) | 17 | 200 | 26 | 1.67 |
| Example 2 | SUS444 | MgO (9 nm) | Fe (1 nm) | 12.2 | 200 | 26 | 1.67 |
| Example 3 | Copper | Al$_2$O$_3$ (5 nm) | Fe (2 nm) | 15 | 117 | 401 | 59.6 × 10$^6$ |
| Example 4 | Copper | Al$_2$O$_3$ (9 nm) | Fe (2 nm) | 10 | 117 | 401 | 59.6 × 10$^6$ |
| Example 5 | Brass | SiO$_2$ (5 nm) | Fe (1 nm) | 13.1 | 103 | 121 | 12.0 × 10$^6$ |
| Example 6 | Brass | SiO$_2$ (9 nm) | Fe (1 nm) | 11.2 | 103 | 121 | 12.0 × 10$^6$ |
| Example 7 | Copper | Al$_2$O$_3$ (2 nm) | Fe (1 nm) | 5.2 | 117 | 401 | 59.6 × 10$^6$ |
| Comparative Example 1 | SUS444 | MgO (1 nm) | Fe (1 nm) | 2.3 | 200 | 26 | 1.67 |
| Comparative Example 2 | SUS444 | MgO (20 nm) | Fe (1 nm) | 1.1 | 200 | 26 | 1.67 |
| Comparative Example 3 | Copper | Al$_2$O$_3$ (1 nm) | Fe (2 nm) | 1.5 | 117 | 401 | 59.6 × 10$^6$ |
| Comparative Example 4 | Copper | Al$_2$O$_3$ (20 nm) | Fe (2 nm) | 0.3 | 117 | 401 | 59.6 × 10$^6$ |
| Comparative Example 5 | Brass | SiO$_2$ (1 nm) | Fe (1 nm) | 2.6 | 103 | 121 | 12.0 × 10$^6$ |
| Comparative Example 6 | Brass | SiO$_2$ (20 nm) | Fe (1 nm) | 0.7 | 103 | 121 | 12.0 × 10$^6$ |
| Comparative Example 7 | Copper | Al$_2$O$_3$ (1.5 nm) | Fe (1 nm) | 3.3 | 117 | 401 | 59.6 × 10$^6$ |

As indicated by the results of Table 1, the carbon nanotube composite structural body of the present invention has an extremely high adhesion strength between the base material and the carbon nanotube columnar structural bodies.

INDUSTRIAL APPLICABILITY

The carbon nanotube composite structural body of the present invention can be suitably used in a pressure-sensitive adhesive member such as a pressure-sensitive adhesive sheet or a pressure-sensitive adhesive film.

The invention claimed is:

1. A carbon nanotube composite structural body, consisting of, in order, a base material, an intermediate layer, a catalyst layer, and a plurality of carbon nanotube columnar structural bodies,
wherein:
   the intermediate layer is present on an upper surface of the base material, such that the upper surface of the base material is completely covered by the intermediate layer;
   the intermediate layer has a thickness of 2.0 nm to 9.0 nm;
   the base material is formed of any one of copper and a copper alloy containing 50 wt % or more of copper;
   the intermediate layer is selected from the group consisting of MgO, Al$_2$O$_3$, and SiO$_2$;
   the catalyst layer is Fe; and
   an adhesion strength between the base material with the intermediate layer and the carbon nanotube columnar structural bodies is 5 N/cm$^2$ or more.

2. A carbon nanotube composite structural body according to claim 1, wherein the base material has a Young's modulus of 250 GPa or less.

3. A pressure-sensitive adhesive member, comprising the carbon nanotube composite structural body according to claim 1.

* * * * *